(12) United States Patent
Bau

(10) Patent No.: US 8,725,810 B1
(45) Date of Patent: May 13, 2014

(54) METHOD AND SYSTEM FOR ANONYMOUS LOGIN FOR REAL TIME COMMUNICATIONS

(75) Inventor: David Bau, Gladwyne, PA (US)

(73) Assignee: Google Inc., Mountain View, CA (US)

( * ) Notice: Subject to any disclaimer, the term of this patent is extended or adjusted under 35 U.S.C. 154(b) by 2260 days.

(21) Appl. No.: 11/173,522

(22) Filed: Jun. 30, 2005

(51) Int. Cl.
*G06F 15/16* (2006.01)
*G06F 3/00* (2006.01)

(52) U.S. Cl.
USPC .......................... 709/205; 709/204; 715/733

(58) Field of Classification Search
USPC ................................................ 709/204–205
See application file for complete search history.

(56) References Cited

U.S. PATENT DOCUMENTS

| | | | | |
|---|---|---|---|---|
| 5,764,916 | A * | 6/1998 | Busey et al. | 709/227 |
| 6,915,336 | B1 * | 7/2005 | Hankejh et al. | 709/219 |
| 2003/0079052 | A1 * | 4/2003 | Kushnirskiy | 709/328 |
| 2004/0107250 | A1 * | 6/2004 | Marciano | 709/204 |
| 2004/0161080 | A1 * | 8/2004 | Digate et al. | 379/88.17 |
| 2004/0225716 | A1 * | 11/2004 | Shamir et al. | 709/204 |
| 2005/0008000 | A1 * | 1/2005 | Korycki et al. | 370/352 |
| 2005/0108033 | A1 * | 5/2005 | Everett-Church | 705/1 |
| 2005/0182817 | A1 * | 8/2005 | Andreev et al. | 709/204 |

* cited by examiner

*Primary Examiner* — Jerry Dennison
*Assistant Examiner* — Adam Cooney
(74) *Attorney, Agent, or Firm* — Shumaker & Sieffert, P.A.

(57) ABSTRACT

A method and system are provided to permit subscribers to a service to engage in real time communications with users who are not subscribers to the service. The method comprises receiving, from a non-subscriber to a service, a request for real time communications with a subscriber to the service and providing real time communications between the subscriber and the non-subscriber.

20 Claims, 6 Drawing Sheets

METHOD AND SYSTEM FOR ANONYMOUS LOGIN FOR REAL TIME COMMUNICATIONS

FIELD OF INVENTION

The field of invention relates generally to real time communications (RTC), and more particularly, to anonymous login for RTC.

BACKGROUND

One increasingly popular computer network-based activity is referred to as "instant messaging" or IM communications, which is a form of RTC. An instant message is a form of electronic communication between users of a computer network in which a window pops-up on the recipient's computer screen "instantly" and without the recipient having to access an e-mail program or otherwise check for messages. An exchange of instant messages between two or more users may be referred to as an IM session. An instant message appears essentially as soon as the message sender clicks the send button subject to any time or propagation delays the message may have encountered on the network. In comparison to most e-mail applications, instant messaging permits users to communicate with each other in a more dynamic, urgent, and interactive manner.

Existing IM applications require a user, who wishes to engage in real time communications with others, to install a version of an instant messaging client on both sender's and recipient's computers. Other IM applications may require that the user is a subscriber, e.g., a user of a relevant on-line service bought from a service provider, in order to "chat" (exchange text-based messages) with other users. These requirements may present inconvenience to users who do not wish to become subscribers or install any additional software on their system, as well as to users who are subscribers but who are unable to "chat" (exchange text-based chat communications) with people who are not subscribers.

SUMMARY

One embodiment, as described herein, permits subscribers to a service to engage in real time communications with users who are not subscribers to the service. One embodiment includes receiving, from a non-subscriber to a service, a request for real time communications with a subscriber to the service and providing real time communications between the subscriber and the non-subscriber.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
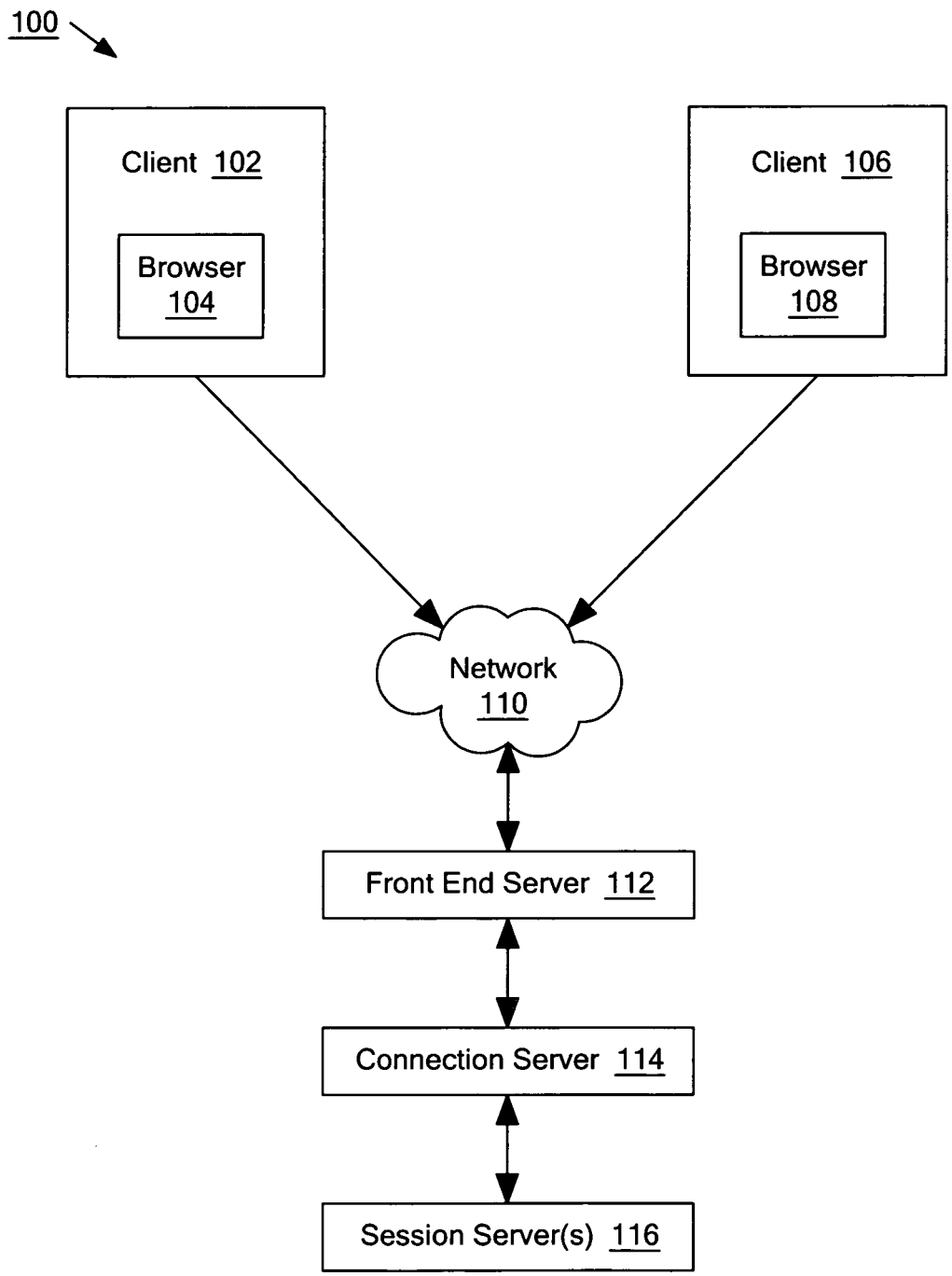
FIG. 1 presents a network diagram illustrating an overview of one embodiment of the present invention.

A method and system are described for providing functionality where service subscribers (e.g., subscribers to a particular web-based email service) are able to engage in real time communications with non-subscribers (e.g., users who have not purchased the relevant service from a provider and/or who have not provided any identifying information to the provider). This functionality may be referred to as anonymous login for RTC. In one embodiment, non-subscribers are able to view on-line presence of subscribers by accessing a web page associated with those subscribers. A non-subscriber may exchange text-based chat messages with a subscriber without using or having to download a text-based chat client. A non-subscriber may also choose to initiate a voice call to the subscriber from the web page. The non-subscriber may download and install voice over IP (VoIP) application without having to go through installation-specific UI screens.

A web page (or a browser page) may communicate with a server via HyperText Transport Protocol (HTTP) methods for a form such as a GET command (that may be used for retrieving data) and a POST command (that may be used for, e.g., storing or updating data), where the communication is initiated by the client (e.g., the client is polling the server for data). In one embodiment, in order to address latency associated with the polling nature of HTTP communications a "hanging GET" command may be utilized, whereby the client initiates an HTTP GET to the server and the server, upon the receipt of the GET command, waits to respond until it has something to report. This technique permits a user to participate in an RTC session utilizing a web browser without having to install any additional software.

In an alternative embodiment, anonymous login for RTC may be achieved by utilizing plug-ins (e.g., a Java plug-in or a Flash plug-in) that may already be installed for a user's browser. Flash is a trademark of Macromedia, Inc. (Flash™) and is used for purposes of this patent to designate a plug-in for the delivery of dynamic and interactive content over the Internet. Flash plug-in, which may be included with leading browsers and operating systems, allows web sites to seamlessly offer audio, video, animation, and advanced interaction and functionality to visitors that is typically not permitted or practical with standard web pages. Java is a trademark of Sun Microsystems, Inc. (Java™). Java plug-in technology establishes a connection between popular browsers and the Java platform. This connection enables applets on web sites to be run within a browser on the desktop. The Java platform may be described as an object oriented language (OOL) platform. Utilizing a Flash or Java plug-in as a simple communication channel rather than a presentation platform allows non-subscribers to participate in RTC session with a subscriber without a need to install an additional RTC client or to subscribe to any additional Internet service.

Overview of One Embodiment

FIG. 1 presents a diagram illustrating an overview of one embodiment of the present invention. Referring to FIG. 1, a system 100 comprises a plurality of clients such as a client 102 having an associated browser application 104 and a client 106 having an associated browser application 108 that may communicate with each other over a network 110 (e.g., LAN, WAN, an Intranet, or the Internet) utilizing a front-end server 112, a connection server 114, and one or more session servers 116. Any of the clients 102 and 106 may be a mobile device such as a portable computer, a personal digital assistant (PDA), a mobile phone, etc. The front-end server 112 accepts requests from clients and proxies them to the appropriate back-end server for processing. Back end servers may include the connection server 114 and the session servers 116. The connection server 114 provides access to resources on the network for users not directly attached to the network and permits network users to access external resources not directly attached to the network. The session servers 116 may be utilized for maintaining states for user sessions with a web system (e.g., a web-based email application).

The client 102, in one embodiment, may be associated with a user who is a subscriber to a particular web service (e.g., a web-based email service) that maintains a communications web page for the subscriber. Subscriber's communications web page, in one embodiment, may be accessed by a non-subscriber, such as a user associated with the client 106. The client 106 may use its browser 108 to access the subscriber's web page via the servers 112-116 and request establishing an RTC session with the subscriber. The subscriber's web page may comprise a browser-based client written in dynamic HyperText Markup Language (DHTML). An RTC session may be, in one embodiment, in the form of text-based chat or voice communications (e.g., utilizing VoIP technology). It will be noted, that the connection server 114 may be configured to establish an RTC session between a subscriber (e.g., the client 102) and a non-subscriber (e.g., the client 106) utilizing certain plug-ins that may already be installed within the non-subscriber browser 108. Such plug-ins, in one embodiment, may include Flash plug-in and Java plug-in.

References throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
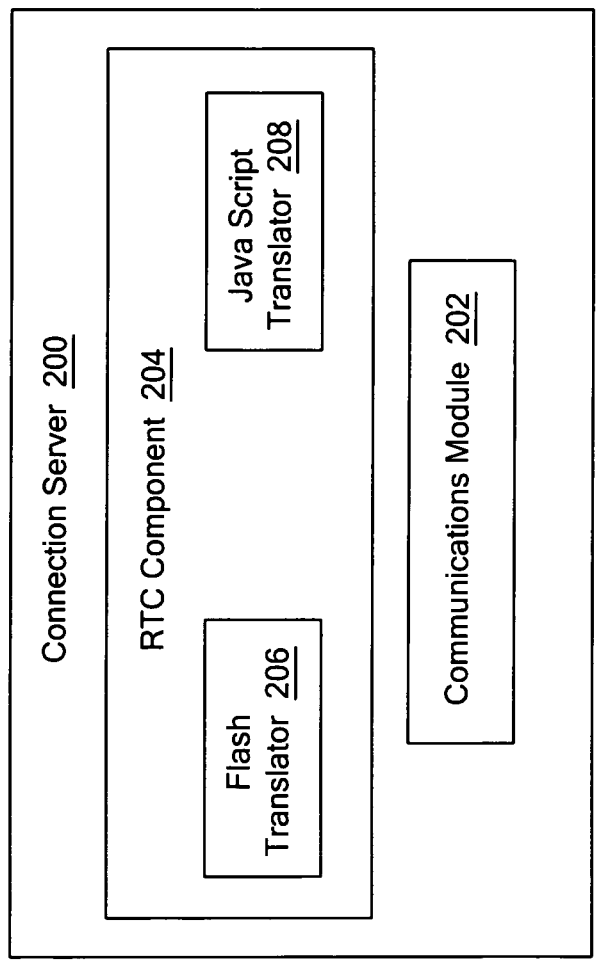
FIG. 2 is a block diagram of a connection server, according to one embodiment of the present invention.

FIG. 2 is a block diagram of a connection server 200, according to one embodiment of the present invention. Referring to FIG. 2, the connection server 200 comprises a communication module 202 to receive requests issued by clients and other servers and an RTC component 204 that may be configured to establish an RTC session between users, such as a subscriber associated with the client 102 and a non-subscriber associated with the client 106. In one embodiment, the RTC component 204 comprises one or more plug-in translators, such as a Flash translator 206 and a Java script translator 208.

When the communication module 202 receives a request for RTC from a non-subscriber, the RTC component 204 of the connection server 200 may first determine if there is a plug-in installed on the non-subscriber's machine that can be used for RTC. If such plug-in is identified, the RTC component 204 invokes an appropriate plug-in translator to permit the requestor to engage in an RTC session with a subscriber.

For example, RTC component 204 may determine that Flash plug-in is available at the non-subscriber's machine. Flash plug-in provides a real time communications option by utilizing an XMLSocket object. The XMLSocket object implements client sockets that allow a computer running the Flash player to communicate with a server computer identified by an IP address or a domain name. The XMLSocket object is available to a script (e.g., a Java script) running inside of a Flash movie. The XMLSocket object allows all communication between the client and the server to be sent over a raw TCP socket rather than utilizing HTTP. Flash plug-in may thus be used as a simple communication channel instead of as a presentation platform (e.g., the height and width may be set to zero on the Flash plug-in so that the Flash player is invisible to the user).

Description of Process

Figure 3:
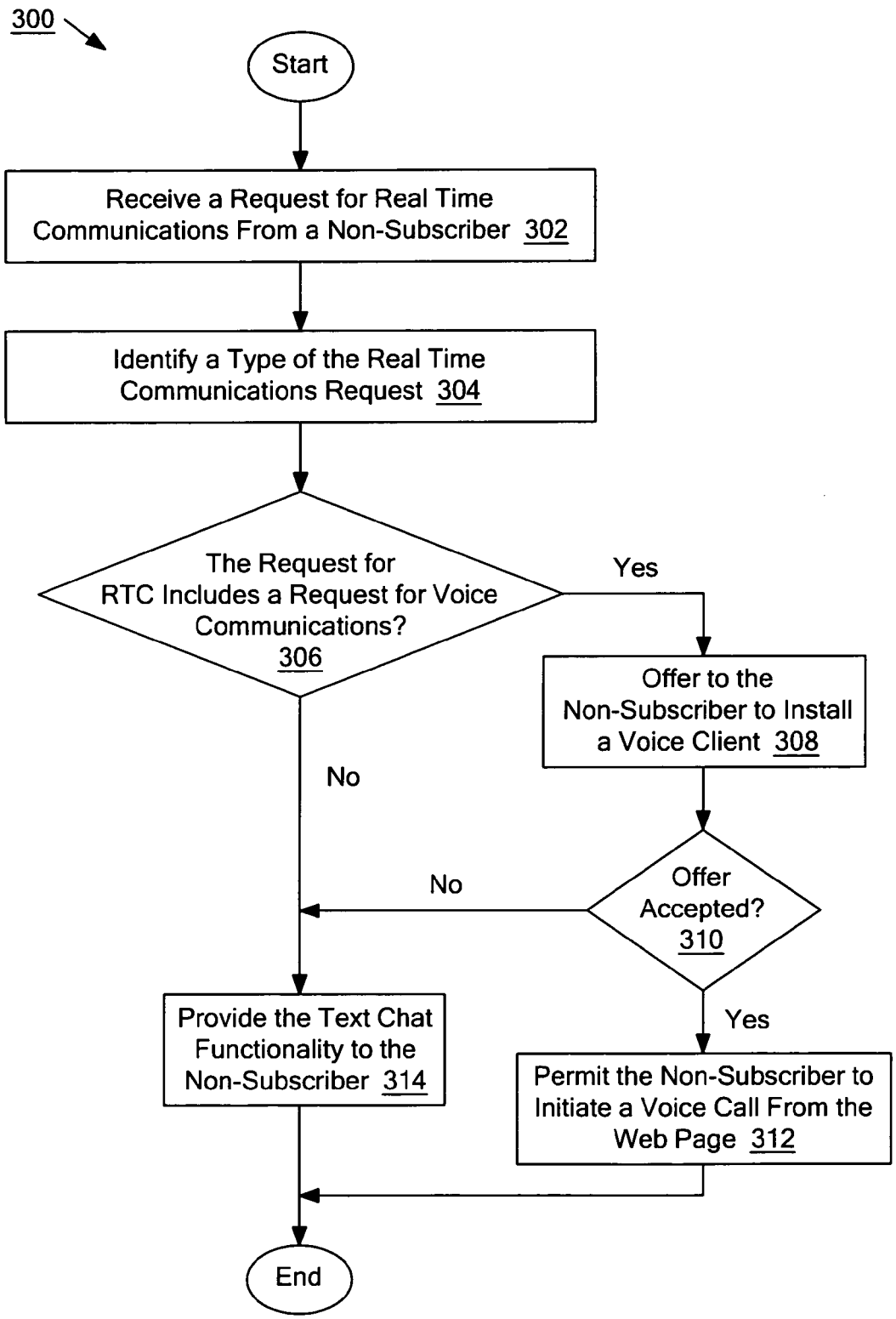
FIG. 3 is a flow diagram illustrating a method for anonymous login for RTC, according to one embodiment of the present invention.

FIG. 3 presents a flow diagram of one embodiment of a method 300 for providing anonymous login for RTC. The method may be performed by processing logic, which may comprise hardware, software, or a combination of both. Processing logic may reside either in a server (e.g., the connection server 114), or partially or entirely in a separate device and/or system(s).

The method 300 commences with processing logic receiving a request for RTC from a non-subscriber (block 302) and identifying the type of requested real time communications (block 304). If it is determined, at block 306, that the request is for voice communications (e.g., if the non-subscriber activated a UI control associated with a voice call request), processing logic proposes that the non-subscriber installs a client (e.g., VoIP software) on the non-subscriber's system at block 308. In one embodiment, the voice client installation procedure does not require any decision making from the non-subscriber once the non-subscriber agrees to perform installation. If the offer to install is accepted at block 310, processing system proceeds with installation of a voice client.

In one embodiment, in order to allow easy installation of VoIP application, the non-subscriber's system is first provided with a cookie containing identification information of both prospective participants of the voice call (the non-subscriber and the subscriber), as well as non-subscriber's authentication information. When the non-subscriber activates a control to download the VoIP application, an appropriate executable file is being downloaded to the non-subscriber's machine, after which the executable file may be launched and then access information stored in the cookie. Thus, a voice call between the subscriber and the non-subscriber may be launched without requiring the non-subscriber to go through additional UI screens.

Once voice software (e.g., VoIP client) is installed on the non-subscriber's system, the non-subscriber is permitted to initiate a voice call to the subscriber (block 312).

If it is determined, at block 306, that the request does not include a request for voice communications, processing logic provides the non-subscriber with text-based chat functionality (block 314).

When Flash plug-in (e.g., comprising a Flash player) is utilized for RTC, the browser communicates with the Flash player. For Flash player to browser communication, the browser, in one embodiment, can capture an event (e.g., an FSCommand event) from the Flash player. The FSCommand event allows the Flash player to send a pair of strings at the same time. For browser to Flash player communication, the browser can read and set variables in the root Flash movie and can send a "goto frame" command to any movie. The code in the target frame is capable of executing an appropriate command as necessary.

A Flash movie file (SWF file), in one embodiment, comprises the following frames:

1. An init frame to initialize a plurality of variables;
2. An idle frame to communicate to the calling script that the movie is idle;
3. A connect frame to execute the connection and then pass control to the idle frame;
4. A send frame to communicate the socket information and then pass control to the idle frame; and
5. A disconnect frame to disconnect and then pass control to the idle frame.

Other variations may be used.

At each frame stage, and in each of the callbacks from the XMLSocket object, the movie will call out to send data to the Java script regarding the current status of the movie. The Java script will write one or more HTML expressions to a document in the specified window in the HTML page and then start a state machine (provided within the script) to track the state of the movie. If the user tries to send a message while the movie is busy, the script state machine will queue up that command and execute it the next time it finds the movie idle. In this way, the calling code can largely ignore the details of the flash movie.

Figure 4:
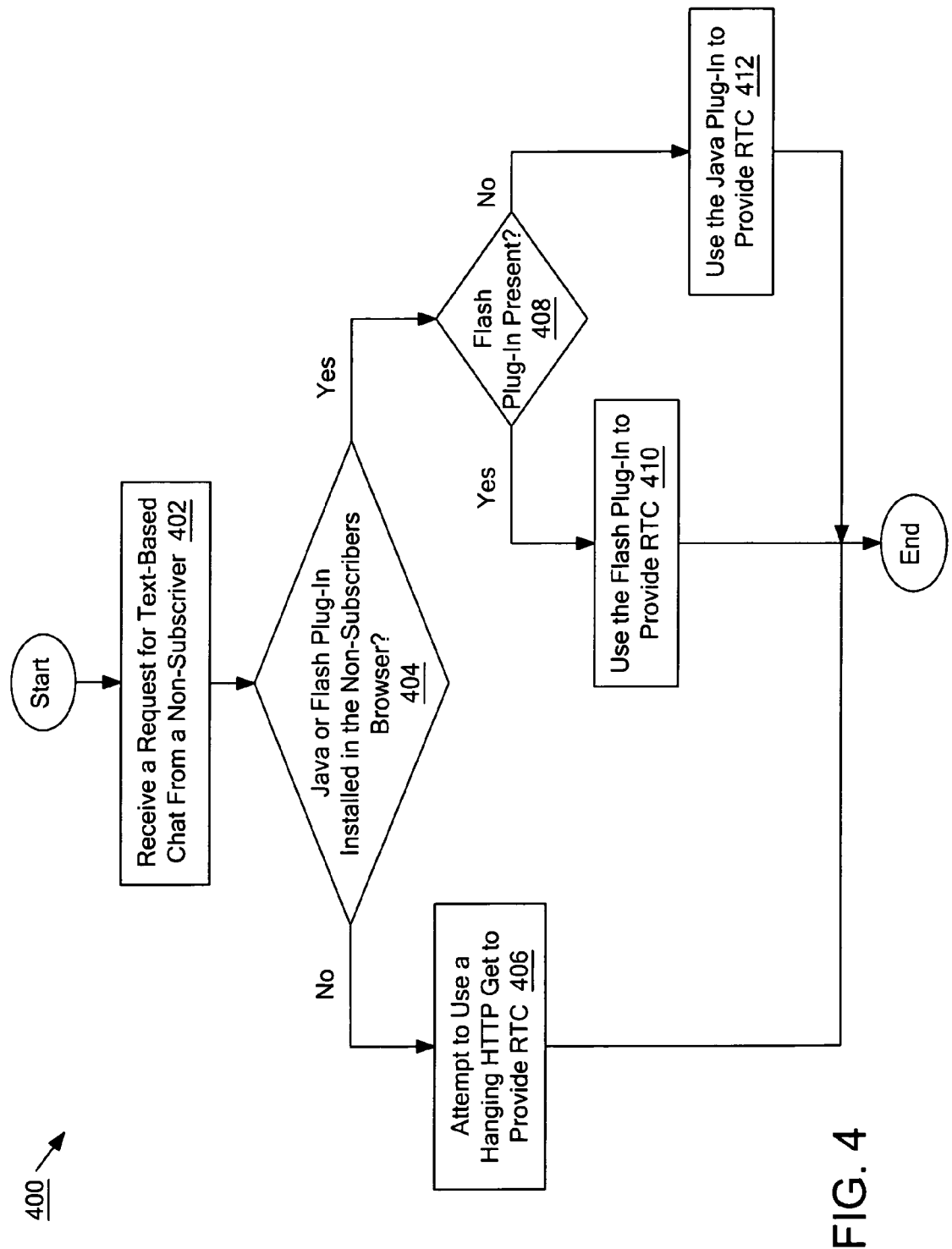
FIG. 4 presents a flow diagram illustrating operations for providing RTC to a non-subscriber, according to one embodiment of the present invention.

FIG. 4 presents a flow diagram illustrating operations for providing RTC to a non-subscriber, according to one embodiment of the present invention. The method may be performed by processing logic, which may comprise hardware, software, or a combination of both. Processing logic may reside either in a server (e.g., an advertisement provider server), or partially or entirely in a separate device and/or system(s).

Referring to FIG. 4, the method 400 commences with processing logic receiving a request for text-based chat from a non-subscriber (block 402). The RTC component 204 determines (block 404) whether a plug-in is installed on the non-subscriber's system that can be utilized to provide an RTC session. In one embodiment, in order to determine whether a plug-in is installed on the non-subscriber's system, an HTTP server (e.g., the server 112) causes a specialized Java script to run on the non-subscriber's machine that is capable of detecting a plug-in and sending data identifying the plug-in back to the HTTP server.

If no such plug-in is identified, the processing logic invokes an alternative method for providing RTC (block 406). This alternative method may comprise receiving an HTTP GET request at the server from the client (e.g., the client 106 associated with the non-subscriber) and holding the request in order to hold the connection for an extended period of time, until the server has data to respond with to the client (e.g., a text message from a subscriber).

If it is determined, at block 404, that the non-subscriber's system has a plug-in already installed that can be used for RTC, the RTC component 204 in the connection server 200 determines if it is a Flash plug-in (block 408). If so, the RTC component 204 utilizes its Flash translator 206 to provide RTC between the non-subscriber and the subscriber (block 410). Otherwise, the RTC component 204 in the connection server 200 utilizes its Java script translator 208 to provide RTC (block 412). It will be noted that where more than one type of plug-in suitable for providing RTC are detected on the non-subscriber's machine, the RTC component 204 may utilize a preferred plug-in, according to predetermined settings.

Illustrative User Interface

Figure 5:
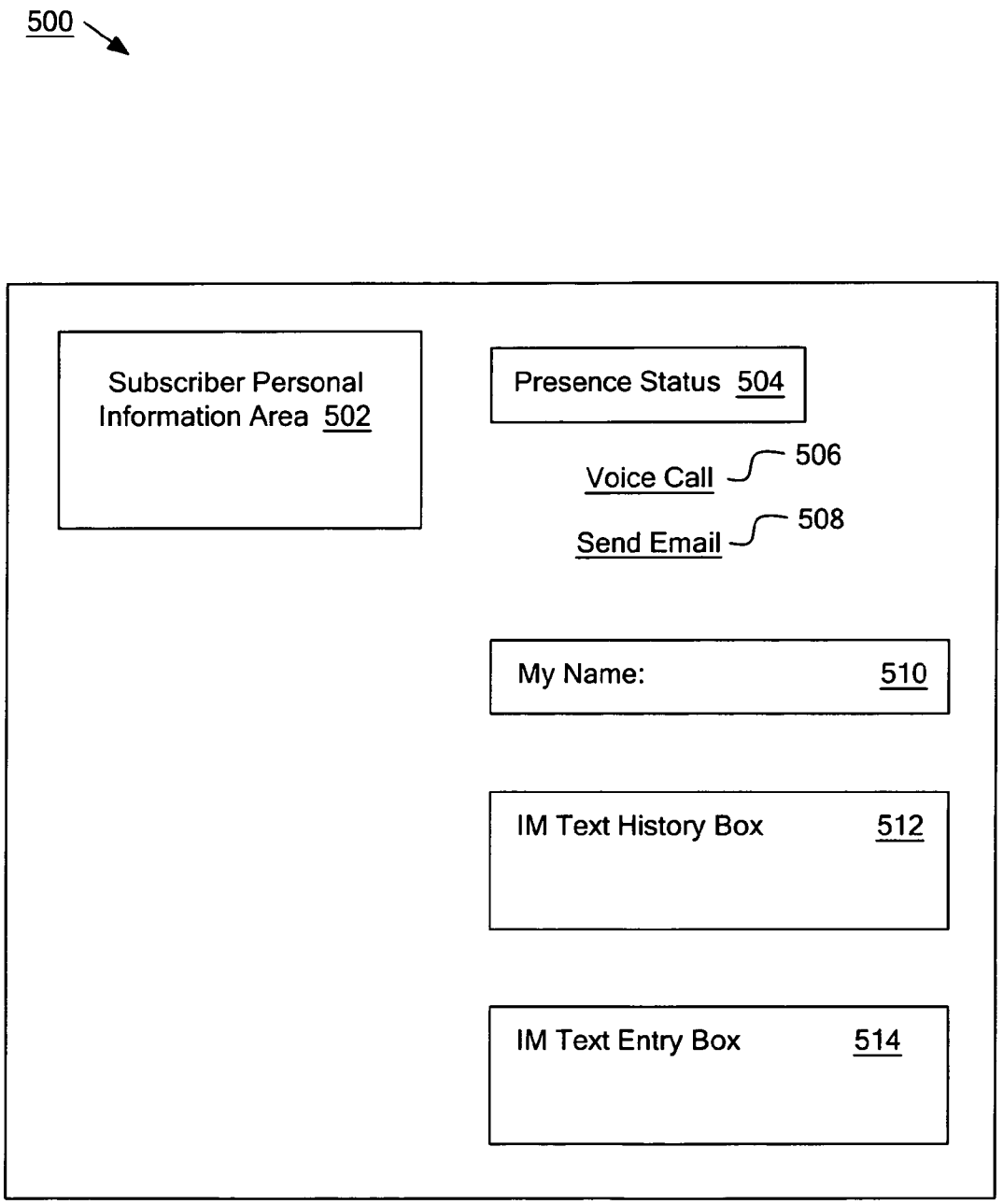
FIG. 5 is a user interface (UI) that may be utilized with a method for anonymous login for RTC, according to one embodiment of the present invention.

FIG. 5 is an illustrative web page 500 that may be accessed by a non-subscriber to view presence of a subscriber and to allow a non-subscriber to engage in real time communications with a subscriber, according to one embodiment of the present invention. A web page similar to the web page 500 may be provided to subscribers as part of the service.

The web page 500, as viewed by a non-subscriber, in one embodiment, comprises subscriber's personal information area 502 and a plurality of controls that allow others, regardless of their status as a subscriber, to view subscriber's presence status (area 504), to request a voice call to the subscriber (control 506), to request text-based chat session (controls 510-514), or to send email to the subscriber (control 508).

Subscriber's personal information area 502 may include information such as subscriber's name, mailing address, occupation, a link to her resume, etc. Subscriber's presence status (area 504) may comprise a status icon indicating whether the subscriber is on-line. The presence status area may also include a text message (e.g., "I'm online—call me!"). Controls for voice call and email may be in the form of hyperlinks.

Controls 510-514 to request text-based chat session may be in the form of edit boxes. The edit box 510 may accept requestor's name, which, in one embodiment, may be any sequence of characters. In one embodiment, a login into an RTC session does not include any verification of the non-subscriber's identity and therefore may be considered to be anonymous. Controls 512 and 514, in one embodiment, are an IM text history box 512 and an IM text entry box 514.

Typing into the IM window would send a message to the subscriber associated with the web page 500. Clicking on the send email link 508 would launch requestor's email program, and clicking on voice call hyperlink 506 would prompt the requestor for a VoIP download if the requestor doesn't already have one, and then start the call.

Spam Prevention Techniques

In one embodiment, methods to allow people to anonymously participate in RTC without opening the system to undesirable amount of unwanted messages (e.g., spam) may include permitting anonymous login only to those non-subscribers who are explicitly invited, and/or monitoring information related to RTC usage by non-subscribers in order to detect impermissible usage.

In an embodiment where only those non-subscribers who are explicitly invited are permitted to participate in RTC, a non-subscriber can get authorization to participate based on an invitation from a subscriber. For example, a subscriber can send an email to a non-subscriber inviting the non-subscriber to participate in an IM session (a chat session) and providing a link (a URL) that could be used by the non-subscriber to access the chat session. The URL may include an authentication token that would give the non-subscriber access rights to use the system. To make the email more effective, in one embodiment, the email may also include a script or an image that indicates whether the inviting subscriber is online in real time (e.g., an image in the body of the email that reads "I'm online now" or "I'm offline now.")

In this scenario, if a non-subscriber engages in impermissible behavior with respect to RTC access, the abusive usage may be linked to the inviting subscriber. For example, a particular subscriber's ability to invite anonymous users may be revoked if it is detected that the invitees use the system in an abusive manner.

In one embodiment, where non-subscribers are permitted to participate in RTC with subscribers without being explicitly invited, the provider's system may be protected against spam by tracking behavior indicative of spam and disallowing the non-subscribers associated with such behavior (abusive users) from further utilizing the system to participate in RTC.

One illustrative technique to prevent abusive users from automatically logging in may include, for example, presenting to a user a graphical "captcha." A "captcha" (an acronym for "completely automated public Turing test to tell computers and humans apart") is a type of challenge-response test used in computing to determine whether or not the user is human. A common type of "captcha" requires that the user types the letters of a distorted and/or obscured sequence of letters or digits that appears on the screen.

In one embodiment, IP addresses associated with impermissible behavior may be stored in a "blacklist" such that no user associated with the blacklist is allowed to participate in RTC. In another embodiment, when an anonymous participant is using a web browser, the anonymous participant may be given a unique cookie, or, if the anonymous participant' browser is configured to not accept cookies, the anonymous participant may be required to accept cookie in order to participate in RTC. Cookies in suspect IP address ranges may be deactivated if the anonymous participant engages in abusive behavior such as spam.

In one embodiment, a Java script challenge may be provided to users associated with suspect IP address ranges or cookies. A Java script challenge is a task that must be executed by a real web browser rather than a spam program imitating a web browser. The challenge could be a program that exploits those capabilities of a real web browser that would be difficult for a spam program to replicate.

One example a Java script challenge is to require execution of an arbitrary piece of Java script. For example such Java script may include the following instructions: "navigate frame 'verfiy1' and frame 'verify2' to specific URLs, and wait for them to redirect until they are fully loaded; then take the URL that is loaded into the frame called 'verify1', add up the last 10 ASCII characters as numbers, multiply by the current contents of the hidden form field called 'x' within the frame called 'verify2', convert the number to a hexadecimal string, reverse the characters, and then send it back." Responding to such Java script challenge typically requires a true Java script interpreter with access to a real browser's object model. The Java script challenge technique may increase the cost and complexity of automatically generating spam, which may discourage RTC participants from sending spam.

Similar code execution challenges may be effective in a non-browser client. For example, the challenge code may include instructions such as "verify the digital signature on this piece of machine code, then execute it, and send the answer back."

Various techniques to detect abusive behavior may include detecting that a large volume of messages has been sent in a short period of time by a particular RTC participant, that a significant fraction of messages sent by a participant receive no replies or are being blocked by other RTC participants.

In one embodiment, in order to detect abusive behavior, Extensible Messaging and Presence Protocol (XMPP) servers could keep counts of frequency of sent messages and flag those RTC users whose frequency of sent messages is above a predetermined threshold. A count may also be kept of the number of messages remaining unanswered or blocked. Such counters may be associated with source RTC sessions, as well as with source IP addresses. When an IP address or a range of IP addresses is flagged as abusive, then that IP address or the range of IP addressees may be blocked, or being challenged (e.g., with captchas) more aggressively.

In one embodiment, the rate of messages that can be sent anonymously within a specific RTC session or from a specific source IP range may be limited in order to attempt to prevent spam. In further embodiments, the number of different users to which messages can be sent within a single RTC session may be restricted. A non-subscriber (as well as a subscriber) may be prevented from sending certain kinds of information, e.g., URLs, images, or email addresses (which are typical in advertisements and may be indicative of spam). In one embodiment, a backend server (e.g., the session server 116) may identify messages that include such information and flag, edit, or block them.

Illustrative Computer System

Figure 6:
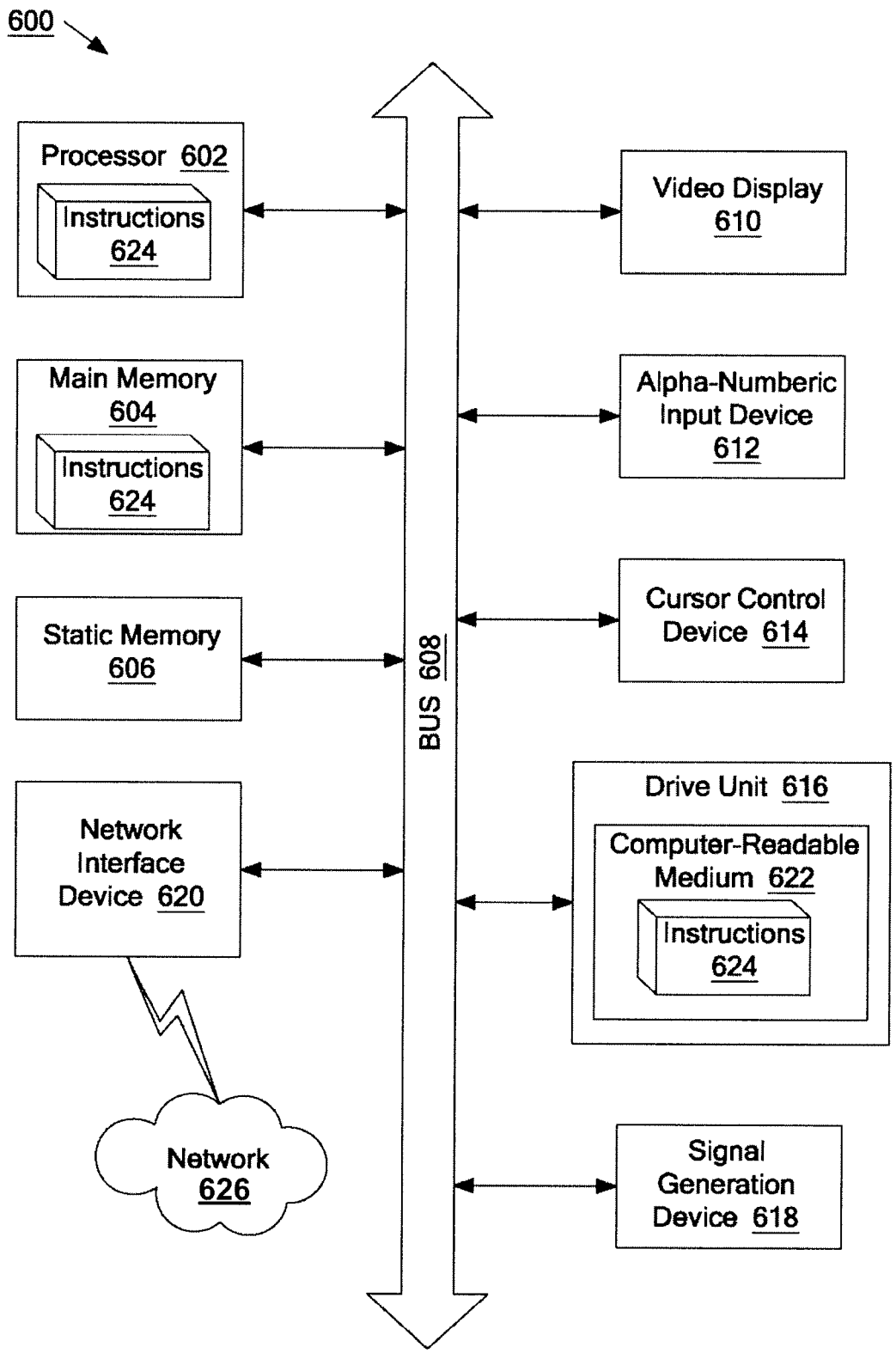
FIG. 6 is a block diagram of one embodiment of a computer system.

FIG. 6 shows a diagrammatic representation of a machine in the exemplary form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

General Legal Statements

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Thus, a method and system for providing anonymous login for RTC have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
receiving, from a non-subscriber to a service, a request for real time communications with a subscriber to the service;
determining, after receiving the request for real time communications, whether a plug-in is installed on a computing device of the non-subscriber that can be utilized to support the real time communications with the subscriber, wherein the plug-in is not purposed for enabling the real time communications and provides other functionality to the computing device that is not associated with the real time communications;
if the plug-in is installed, providing the real time communications between the subscriber and the non-subscriber utilizing the detected plug-in; and
if the plug-in is not installed, providing the real time communications between the subscriber and the non-subscriber with an alternative method that does not involve downloading the plug-in to the non-subscriber's computing device.

2. The method of claim 1, wherein the request for real time communications is a request for text-based chat communications.

3. The method of claim 1, wherein the providing of the real time communications comprises initiating an Instant Messaging (IM) session.

4. The method of claim 1, wherein the request for real time communications is a request for a voice call.

5. The method of claim 1, wherein the providing of the real time communications comprises offering the non-subscriber a real time communications process.

6. The method of claim 1, wherein the providing of the real time communications is in response to identifying a request acceptance by the subscriber.

7. The method of claim 2, wherein the alternative method to provide the real time communications of text-based chat communications comprises utilizing a hanging GET request.

8. The method of claim 7, wherein the utilizing of the hanging GET request comprises:
receiving a request at a server; and
holding the request until response data is available.

9. The method of claim 2, wherein the providing of the real time communications to provide text-based chat communications comprises utilizing plug-in, which is associated with a non-subscriber browser, the plug-in being to deliver dynamic content to a browser application over the Internet.

10. The method of claim 9, wherein the plug-in is a Flash player.

11. The method of claim 2, wherein the providing of the real time communications to provide text-based chat communications comprises utilizing the plug-in associated with the non-subscriber's browser, the plug-in being to establish connection between a browser and an object oriented language (OOL) platform.

12. The method of claim 11, wherein the plug-in is a Java plug-in.

13. An apparatus comprising:
a processor coupled to a memory, the memory storing:
a communication module to receive, from a non-subscriber to a service, a request for real time communications with a subscriber to the service; and
a real time communications module communicably coupled to the communication module, the real time communications module to:
determine, after receiving the request for real time communications, whether a plug-in is installed on a computing device of the non-subscriber that can be utilized to support the real time communications with the subscriber, wherein the plug-in is not purposed for enabling the real time communications and provides other functionality to the computing device that is not associated with the real time communications;
if the plug-in is installed, provide, from the non-subscriber to the service, the real time communications with the subscriber to the service utilizing the detected plug-in; and
if the plug-in is not installed, provide an alternative method for the real time communications with the subscriber to the service, wherein the alternative method does not involve downloading the plug-in to the non-subscriber's computing device.

14. The apparatus of claim 13, wherein the real time communications module is to provide text-based chat communications.

15. The apparatus of claim 13, wherein the real time communications module is to provide voice-based communications.

16. The apparatus of claim 14, wherein the alternative method for real time communications module is to provide text-based chat communications utilizing a hanging GET request.

17. The apparatus of claim 14, wherein the real time communications module is to provide text-based chat communications utilizing a Flash plug-in associated with the non-subscriber's browser.

18. The apparatus of claim 14, wherein the real time communications module is to provide text-based chat communications utilizing a Java plug-in associated with the non-subscriber's browser.

19. An apparatus comprising:
means for receiving, from a non-subscriber to a service, a request for real time communications with a subscriber to the service;
means for determining, after receiving the request for real time communications, whether a plug-in is installed on a computing device of the non-subscriber that can be utilized to support the real time communications with the subscriber, wherein the plug-in is not purposed for enabling the real time communications and provides other functionality to the computing device that is not associated with the real time communications;

if the plug-in is installed, means for providing the real time communications between the subscriber and the non-subscriber utilizing the detected plug-in; and if the plug-in is not installed, means for providing the real time communications between the subscriber and the non-subscriber with an alternative method that does not involve downloading the plug-in to the non-subscriber's computing device.

20. A non-transitory computer readable medium comprising instructions, which when executed on a processing system, cause the processing system to perform a method comprising:

receiving, from a non-subscriber to a service, a request for real time communications with a subscriber to the service;

determining, after receiving the request for real time communications, whether a plug-in is installed on a computing device of the non-subscriber that can be utilized to support the real time communications with the subscriber, wherein the plug-in is not purposed for enabling the real time communications and provides other functionality to the computing device that is not associated with the real time communications;

if the plug-in is installed, providing the real time communications between the subscriber and the non-subscriber utilizing the detected plug-in; and if the plug-in is not installed, providing the real time communications between the subscriber and the non-subscriber with an alternative method that does not involve downloading the plug-in to the non-subscriber's computing device.

* * * * *